US009522851B2

(12) United States Patent
Abry et al.

(10) Patent No.: US 9,522,851 B2
(45) Date of Patent: Dec. 20, 2016

(54) METHOD FOR PRODUCING FERTILIZERS CONTAINING DISPERSED MICRONIZED SULPHUR

(75) Inventors: Raymond G. F. Abry, Calgary (CA); Todd Beasley, Calgary (CA); Richard Lyle Johnson, Vegreville (CA); Jin Kwon Tak, Edmonton (CA)

(73) Assignee: CCR Technologies, Ltd., Calgary (CA)

( * ) Notice: Subject to any disclaimer, the term of this patent is extended or adjusted under 35 U.S.C. 154(b) by 0 days.

(21) Appl. No.: 13/819,557

(22) PCT Filed: Aug. 26, 2011

(86) PCT No.: PCT/IB2011/002699
§ 371 (c)(1),
(2), (4) Date: Feb. 27, 2013

(87) PCT Pub. No.: WO2012/025832
PCT Pub. Date: Mar. 1, 2012

(65) Prior Publication Data
US 2013/0167604 A1     Jul. 4, 2013

Related U.S. Application Data

(60) Provisional application No. 61/377,509, filed on Aug. 27, 2010.

(51) Int. Cl.
*C05C 3/00*     (2006.01)
*C05D 9/00*     (2006.01)
*C05G 3/00*     (2006.01)

(52) U.S. Cl.
CPC .......... *C05C 3/00* (2013.01); *C05C 3/005* (2013.01); *C05D 9/00* (2013.01); *C05G 3/007* (2013.01)

(58) Field of Classification Search
CPC ............ C05C 3/00; C05C 3/005; C05D 9/00; C05G 3/007
USPC ..................................... 71/54–63
See application file for complete search history.

(56) References Cited

U.S. PATENT DOCUMENTS

| 3,333,939 | A | | 8/1967 | Davis | |
| 4,256,691 | A | * | 3/1981 | Ott | 422/7 |
| 4,321,079 | A | * | 3/1982 | Ott | 71/61 |
| 4,824,656 | A | | 4/1989 | Rice | |
| 5,571,303 | A | * | 11/1996 | Bexton | 71/34 |
| 5,653,782 | A | | 8/1997 | Stern | |
| 5,725,630 | A | * | 3/1998 | Roberts et al. | 71/11 |
| 2013/0167604 | A1 | * | 7/2013 | Abry et al. | 71/63 |

FOREIGN PATENT DOCUMENTS

WO     WO 2008/041132     4/2008

* cited by examiner

*Primary Examiner* — Jennifer A Smith
(74) *Attorney, Agent, or Firm* — Bushman Werner, P.C.

(57) ABSTRACT

A method of producing a fertilizer composition containing micronized sulphur wherein elemental sulphur is dissolved in anhydrous or hydrous ammonia to form an ammonia/sulphur solution and the ammonia/sulphur solution is reacted with an acidic component having at least one plant growth constituent to simultaneously form a sulphur composition comprising a sulphur compound and micronized sulphur. The thus formed fertilizer composition is dried and can be formed into various shapes such as pellets, prills, etc.

11 Claims, No Drawings

METHOD FOR PRODUCING FERTILIZERS CONTAINING DISPERSED MICRONIZED SULPHUR

CROSS REFERENCE TO RELATED APPLICATION

This application claims priority to U.S. Patent Application Ser. No. 61/377,509 filed on Aug. 27, 2010 the disclosure of which is incorporated herein by reference for all purposes.

FIELD OF THE INVENTION

The present invention relates to a method of producing fertilizers containing dispersed elemental sulphur fines, i.e., micronized sulphur, that are integrated within the fertilizer.

DESCRIPTION OF PRIOR ART

The majority of the commercial fertilizer manufacturing processes involve reactions between acidic and basic starting constituents to generate a neutralized or partially neutralized final product that is either granulated, prilled, rotoformed or spray dried. Additionally, considerable effort has been expended on attempts to develop processes for making sulphur containing fertilizers due to the benefits associated with the influence of sulphur on crop yields, i.e., the more efficient uptake of other plant nutrients such as nitrogen and phosphorus and its ability to lower the pH of alkaline soils.

One of the most common examples of a fertilizer is ammonium sulphate with the ammonium cation contributing nitrogen to the plants and the sulphate anion contributing the sulphur to the plants. Being highly soluble in water, ammonium sulphate can provide plants with a rapid dose of both constituents. Unfortunately, heavy rain can accelerate the leaching of the sulphate from the soil and dilute the potential maximum benefit plants can attain from the presence of sulphur in the sulphate form. This rapid but non-sustaining dose of sulphate to the plants has driven the efforts behind developing elemental sulphur containing fertilizers. The advantage of having elemental sulphur as part of the fertilizer composition is that the elemental sulphur will oxidize over time, providing a sustained, time release sulphate dose to the plants. Elemental sulphur is also less prone to being washed away so will be resident near the plants for a longer period of time.

One of the problems in working with elemental sulphur is the economic and safe generation of fine sulphur particles. Current methods used include physical grinding (ball milling) of solid sulphur or spraying fine molten sulphur particles into water. These processes pose disadvantages which include but are not limited to safety, consistency of product and capital and operating expenses. Adding these sulphur particles to fertilizers poses additional difficulties associated with integrity of the sulphur coating, the amount of elemental sulphur that can be incorporated into the fertilizer and difficulties in achieving uniform distribution of elemental sulphur throughout the fertilizer, e.g., the pellet.

The particle size of the elemental sulphur that is incorporated within the fertilizer granules will also affect its ability to be oxidized in a timely manner so that sulphate is available to the plants during the growing season. The finer (smaller mean particle diameter) these elemental sulphur particles are, the easier they are oxidized to sulphate. On a relative basis, sulphur particles described in existing commercial fertilizers are expected, at best, to start contributing sulphate sulphur to the plants six to eight weeks after application.

U.S. Pat. No. 3,333,939, incorporated herein by reference for all purposes, teaches a method that requires the handling of solid sulphur particles as well as an alternate method utilizing molten sulphur. The former has the hazards associated with handling fine dusts whereas the latter inhibits even distribution of the fertilizer components to the soil after application.

Patent Application 2006/0144108, incorporated herein by reference for all purposes, teaches two methods whereby liquid (molten) sulphur is added either to an ammonium phosphate reaction vessel or to a granulator to disperse the elemental sulphur within the resulting granules. The phosphoric acid in the reactor is combined with either concentrated aqueous ammonia or anhydrous gaseous ammonia. The second method described relates to a slurry of elemental sulphur particles in water being added to an agitated pre-neutralizer reactor containing phosphoric acid and ammonia. By adding the sulphur slurry to the pre-neutralizer, higher sulphur loadings were achieved without experiencing plugging because of perceived better mixing.

As illustrated by the prior art discussed above, it is advantageous to have an improved method for the manufacturing of fertilizers that incorporate fine (micronized) sulphur particles.

It is well known that elemental sulphur is soluble in anhydrous ammonia (Ruff and Hecht, "Uber das Sulfammonium and seine Beziehungen zum Schwefelstickstoff", Z. anorg. Chem. Bd 70, 1911; U.S. Pat. No. 4,824,656; U.S. Patent Application Publication 2006/00443002; Proceedings of the 2nd International Symposium on Phosphogypsum held in Miami, Fla., Dec. 10-12, 1986 p 143; and WO 2004/109714).

SUMMARY OF THE INVENTION

In one aspect the present invention provides a method of making a fertilizer composition containing micronized sulphur particles.

In one aspect of the present invention, there is provided a method by which the mean particle size of the sulphur fines in a fertilizer composition can be controlled and varied by varying the dissolved sulphur concentration in certain solutions.

In a further aspect of the invention, discrete elemental sulphur particles and flocs can be incorporated into fertilizer compositions, to give a traditional fertilizer product with elemental sulphur integrated therein.

DETAILED DESCRIPTION OF PREFERRED EMBODIMENTS

As taught by Ruff and Hecht, elemental sulphur from all sources can be dissolved into either liquid anhydrous ammonia or liquid hydrous ammonia to create ammonia-sulphur solutions, hereinafter referred to as AMS solutions. AMS solutions can have varying concentrations of elemental sulphur dissolved in them which is controlled by the temperature, pressure and water content of the AMS solutions.

As used here, "anhydrous ammonia" refers to ammonia having less than about 0.3 wt % by water while "hydrous ammonia" refers to ammonia containing from about 0.3 up to about 70 wt. % water, preferably from about 0.3 up to about 10 wt % water. Although preferred solvents for this invention are anhydrous and hydrous ammonia as described above, other solvents may include liquid sulphur dioxide, liquid or super critical carbon dioxide, carbon disulphide, dimethyldisulfide, etc., including blends of various solvents as described above including blends with water.

It has been found that by varying the concentration of dissolved sulphur in the AMS solutions as well as the type of media into which the AMS solution is introduced to create micronized elemental sulphur particles, the mean sulphur particles size can be varied in a controlled manner.

By way of example, AMS solutions can be "blown down" into deionized water; water containing varying concentrations of cations, anions and amphoteric species; water containing varying concentrations of cations, anions and amphoteric species with some near or at their respective saturation points; suitable gaseous phases such as nitrogen as well as into evacuated containers, to create discrete sulphur particles with mean submicron particle sizes as well as flocs (loose agglomerations of discrete micronized sulphur particles) of up to 150 microns. In addition to the "blow down", manipulation of temperature and pressure of the AMS solutions into or in the presence of the above fluids can also be used to create the desired micronized sulphur particles.

It will be understood that in forming the AMS solutions, the AMS will be under sufficient pressure to maintain the AMS solution in the liquid state until the reaction with the acidic compound. In this regard, and as is well known, anhydrous ammonia, in liquefied form, must be under pressure to maintain it in that state. The AMS solutions of the present invention can be formed either by dissolving solid, elemental sulphur, regardless of its form, in the AMS solution, or by introducing liquid sulphur into the AMS solution. With respect to the use of solid elemental sulphur, such sulphur sources include sulphur blocks, prills, slated sulphur, sulphur pad bottoms containing impurities such as dirt, etc. WO 2008/041132, incorporated herein by reference for all purposes, discloses various methods for forming micronized sulphur using both solid and liquid forms of sulphur.

It has been found that the solubility of the elemental sulphur and anhydrous ammonia decreases as hydrous ammonia is created with increasing water content. In general, the amount of sulphur present in the sulphur solvent will be the maximum that can be achieved while still maintaining a true solution. Thus, the sulphur in the AMS solution can be present up to the point of saturation provided the conditions are such that the saturated solution maintains the sulphur as a true solution.

With respect to the micronized sulphur produced according to the present invention, it will generally have an average particle size of less than about 9,999 µm to sub-colloidal range, preferably less than 1,000 µm to sub-colloidal range, more preferably less than 100 µm to sub-colloidal range, and still more preferably less than 25 µm to sub-colloidal range. Especially preferred is micronized sulphur of less than 10 µm to sub-colloidal range.

As part of the present invention and depending on the particle size of the micronized sulphur created, dispersants or emulsifiers may or may not be utilized for periods of time to keep the sulphur in suspension. By way of example, suspensions of submicron sulphur particles stay relatively homogeneous for several hours with separation occurring after being quiescent for 8 hours.

It has been found that as the concentration of the elemental sulphur dissolved in the AMS solutions increases, the form of the micronized sulphur particles changes from discrete particles to loose assemblages of these discrete particles, hereinafter referred to as flocs. Flocs are also created after the discrete micronized sulphur particles have settled out of solution and re-suspension is attempted. It is believed that Van der Waal interactive forces induce these particles to agglomerate into the flocs seen.

It is well known that the particle size of elemental sulphur directly impacts the rate at which the sulphur particle to be oxidized into sulphate. An unexpected finding was that the flocs formed have virtually the same oxidation rates as the discrete elemental sulphur particles that make up the flocs. Given that the mean particle size ranges of the micronized sulphur can be varied in a controlled manner, discrete elemental sulphur particles, as well as flocs formed therefrom, can be selectively created to provide a blended product with a tailored oxidation rate of elemental sulphur to sulphate, i.e., a time release product.

In forming the fertilizer compositions of the present invention, the AMS solution is reacted with an acidic compound that has at least one plant growth constituent to thereby simultaneously form a fertilizer composition comprising a fertilizer compound and micronized sulphur. The fertilizer composition recovered after drying can be formed into various shapes, e.g., pellets, prills, or any other shape, form, or size by well known methods and equipment.

One of the features of the present invention is the ability to provide a time-release fertilizer composition. In this regard, an AMS solution having one sulphur concentration which can produce micronized sulphur of one average particle size and a second AMS solution of a second sulphur concentration which can produce micronized sulphur of a second, different, average particle size, can be used to react with the acidic components to form the fertilizer composition. Since the amount of sulphur in the AMS solution dictates, to a certain extent, the particle size of the micronized sulphur produced, there will then be produced in the fertilizer composition, micronized sulphur of the different average particle sizes. As noted above, the smaller particle size will oxidize more rapidly into the sulphate form in the soil, while the larger average particle size micronized sulphur will oxidize more slowly. Thus it will be a sustained formation of sulphate in the soil over a longer period of time. Furthermore, by forming flocs in combination with micronized particles, the sustained, time release effect can also be achieved.

The acidic component reacted with the AMS to form the fertilizer compound can be any acidic component which when reacted with the ammonia present in the AMS will form a fertilizer compound, wherein the fertilizer compound is defined as a compound which when admixed with soil or applied to plants will enhance the growth of the plants. Non-limiting examples of typical acidic compounds which have at least one plant growth constituent and which can react with the ammonia in the AMS to produce a fertilizer compound include sulphuric acid, phosphoric acid, nitric acid, carbonic acid, and their various derivatives as well as mixtures thereof. Thus, as is well known, fertilizer compounds such as ammonium sulphate, ammonium nitrate, ammonium phosphate, ammonium carbonate, etc. can be formed.

One of the clear advantages of the present invention is the fact that by incorporating the micronized sulphur into the fertilizer composition according to the present invention, the micronized sulphur is essentially uniformly dispersed within the matrix of the final fertilizer form (i.e. pellet, prill, etc.), a clear advantage in terms of ensuring that all treated soil or plants receive substantially the same amount of micronized sulphur as well as the fertilizer compound.

According to the present invention, once the fertilizer composition has been formed, it is possible to add additional AMS solution during the drying step to provide a larger quantity of micronized sulphur in the fertilizer composition.

It will also be recognized that other components typically used in fertilizer compositions and containing plant nutrients can be added to the fertilizer composition once it is formed and preferably prior to it being formed in the desired shapes such as pellets, prills, etc.

Example 1

Several 0.2 wt % to 10 wt % AMS solutions were injected into water, aqueous ammonium sulphate slurries and aqueous ammonium sulphate slurries having sufficient sulphuric acid to stoichiometrically react with all of the ammonia added via the AMS solutions. In all cases micronized elemental sulphur was created. As the sulphur concentration in the AMS solutions increased so did the tendency to create flocs.

Flocs created during these tests were isolated and examined photomicrographically. It was seen that discrete micronized elemental sulphur particles had agglomerated into the flocs, but were uniformly distributed in the fertilizer composition containing ammonium sulphate.

Example 2

Addition of the AMS solutions to the aqueous ammonium sulphate slurry resulted in the formation of both discrete micronized elemental sulphur as well as the flocs. The presence of flocs was confirmed by dissolving the resulting ammonium sulphate-sulphur mixture in an excess of water. Distinct flocs were noted.

Example 3

Addition of the AMS solutions to the aqueous ammonium sulphate slurries containing excess sulphuric acid showed a marked increase in viscosity, indicating more solids production and the successful reaction between the AMS solutions and the sulphuric acid. Micronized elemental sulphur was uniformly distributed within the slurry.

What is claimed is:

1. A method of producing fertilizer compositions containing micronized sulphur comprising the steps of:
    first dissolving elemental sulphur in an anhydrous or hydrous ammonia solution to form an ammonia/sulphur solution (AMS solution);
    second, reacting said AMS solution with an aqueous solution of an acidic compound selected from the group consisting of (a) sulphuric acid and its derivatives, (b) phosphoric acid and its derivatives, (c) nitric acid and its derivatives, (d) carbonic acid and its derivatives, and (e) mixtures thereof to simultaneously form a fertilizer composition comprising a fertilizer compound and micronized sulphur, said micronized sulphur being uniformly dispersed in said fertilizer composition; and
    third, drying said fertilizer composition.

2. The method of claim 1, wherein said AMS solution is under sufficient pressure to maintain said AMS solution as a liquid until reacted.

3. The method of claim 1, wherein said micronized sulphur has an average particle size of less than 1,000 µm.

4. The method of claim 3, wherein said average particle size is less than 10 µm.

5. The method of claim 1, wherein other components containing plant nutrients can be added to said fertilizer composition.

6. The method of claim 1, wherein said AMS solution is formed by dissolving solid elemental sulphur.

7. The method of claim 1, wherein said AMS solution is formed by dissolving molten elemental sulphur.

8. The method of claim 1, wherein there is a first AMS solution having a first sulphur concentration to produce micronized sulphur having a first average particle size and a second AMS solution having a second sulphur concentration to produce a micronized sulphur having a second, larger average particle size.

9. The method of claim 1, wherein said micronized sulphur is in the form of flocs.

10. A method of producing fertilizer compositions containing micronized sulphur comprising the steps of:
    first dissolving elemental sulphur in an anhydrous or hydrous ammonia solution to form an ammonia/suphur solution (AMS solution);
    second, reacting said AMS solution with an aqueous solution of an acidic compound selected from the group consisting of (a) sulphuric acid and its derivatives, (b) phosphoric acid and its derivatives, (c) nitric acid and its derivatives, (d) carbonic acid and its derivatives, and (e) mixtures thereof to simultaneously form a fertilizer composition comprising a fertilizer compound and micronized sulphur, said micronized Sulphur being uniformly dispersed in said fertilizer composition; and
    third, drying said fertilizer composition, adding additional AMS solution to said fertilizer composition while drying.

11. A method of producing fertilizer compositions containing micronized sulphur comprising the steps of:
    first providing a first ammonia/sulphur solution (AMS solution) of a first sulphur concentration;
    second, providing a second AMS solution of a second higher sulphur concentration;
    third, reacting said first and second AMS solutions with an acidic compound selected from the group consisting of (a) sulphuric acid and its derivatives, (b) phosphoric acid and its derivatives, (c) nitric acid and its derivatives, (d) carbonic acid and its derivatives, and (e) mixtures thereof to simultaneously form a fertilizer composition comprising a fertilizer compound and a first micronized sulphur of a first particle size and a second micronized sulphur of a second, larger particle size, said micronized sulphur being uniformly dispersed in said fertilizer composition; and
    fourth, drying said fertilizer composition.

* * * * *